United States Patent
Hemige et al.

(10) Patent No.: US 10,951,528 B2
(45) Date of Patent: Mar. 16, 2021

(54) NETWORK LOAD BALANCING

(71) Applicant: Cisco Technology, Inc., San Jose, CA (US)

(72) Inventors: Venugopal Hemige, San Ramon, CA (US); Praveen Raju Kariyanahalli, San Ramon, CA (US); Ravi Konduri, San Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 84 days.

(21) Appl. No.: 16/021,349

(22) Filed: Jun. 28, 2018

(65) Prior Publication Data
US 2019/0140955 A1 May 9, 2019

Related U.S. Application Data

(60) Provisional application No. 62/539,444, filed on Jul. 31, 2017.

(51) Int. Cl.
*H04L 12/803* (2013.01)
*H04L 12/26* (2006.01)

(52) U.S. Cl.
CPC ........ *H04L 47/125* (2013.01); *H04L 43/0811* (2013.01)

(58) Field of Classification Search
None
See application file for complete search history.

(56) References Cited

U.S. PATENT DOCUMENTS

| | | | | |
|---|---|---|---|---|
| 2013/0229910 | A1* | 9/2013 | McKnight, Jr. | H04W 24/04 370/218 |
| 2014/0201383 | A1* | 7/2014 | Kuehnel | H04W 88/06 709/231 |
| 2016/0337954 | A1* | 11/2016 | Gulati | H04W 76/14 |
| 2017/0078956 | A1* | 3/2017 | LeBlanc | H04W 48/18 |
| 2018/0054793 | A1* | 2/2018 | Renaldi | H04L 67/18 |

* cited by examiner

*Primary Examiner* — Diane L Lo
(74) *Attorney, Agent, or Firm* — Polsinelli PC

(57) ABSTRACT

A method of routing network traffic may include determining a first data link preference configuration indicating a first preference order for a first plurality of data links over which a first network device communicates. The method may also include receiving a second data link preference configuration indicating a second preference order for a second plurality of data links over which a second network device communicates. The method may additionally include, based on a combination of the first data link preference configuration and the second data link preference configuration, determining a preferred data link to transmit data from the first network device to the second network device. The method may include transmitting data over the preferred data link from the first network device to the second network device.

20 Claims, 6 Drawing Sheets

NETWORK LOAD BALANCING

CROSS REFERENCE TO RELATED APPLICATIONS

This application claims priority to U.S. Patent App. No. 62/539,444, filed on Jul. 31, 2017, which is hereby incorporated by reference in its entirety.

FIELD

The embodiments discussed in the present disclosure are related to network load balancing.

BACKGROUND

The use of networks is a useful tool in allowing communication between distinct computing devices. Despite the proliferation of computers and networks over which computers communicate, there still remain various limitations to current network technologies.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method of routing network traffic. The method may include determining a first data link preference configuration indicating a first preference order for a first plurality of data links over which a first network device communicates. The method may also include receiving a second data link preference configuration indicating a second preference order for a second plurality of data links over which a second network device communicates. The method may additionally include, based on a combination of the first data link preference configuration and the second data link preference configuration, determining a preferred data link to transmit data from the first network device to the second network device. The method may include transmitting data over the preferred data link from the first network device to the second network device.

One or more embodiments of the present disclosure may additionally include non-transitory computer readable media for facilitating the performance of such methods.

One or more embodiments of the present disclosure may include a system for routing network traffic. The system may include a second network device configured to communicate over a second plurality of data links. The system may also include a first network device configured to communicate over a first plurality of data links. The first network device may include one or more processors. The first network device may also include one or more non-transitory computer-readable media that include computer-readable instructions stored thereon that are executable by the one or more processors to perform or control performance of operations. The operations may include determine a first data link preference configuration indicating a first preference order for the first plurality of data links over which the first network device communicates. The operations may also include receive a second data link preference configuration indicating a second preference order for the second plurality of data links for the second network device over which the second network device communicates. The operations may additionally include determine a preferred data link to transmit data from the first network device to the second network device based on a combination of the first data link preference configuration and the second data link preference configuration. The operations may include transmit data over the preferred data link from the first network device to the second network device.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments of the present disclosure relate to improvements to the operation of networks, and routing of network traffic. In a network that includes multiple data links for routing network traffic between two nodes in the network, selection of one of those data links may be based on a data link preference of both a remote device and a local device. For example, the local device may determine to transmit network traffic over a preferred data link based on the local device and the remote device having a high preference for the preferred data link. For example, the local device may be a network device with a Long Term Evolution (LTE) data link and a Multi-Protocol Label Switching (MPLS) data link. Transmitting network traffic over the LTE data link may be faster and less expensive than transmitting network traffic over the MPLS data link, and thus, may be a preferred data link for the local device. The remote device may be a network device that equally prefers to receive data over the LTE data link and/or the MPLS data link. The local device may transmit the network traffic over the LTE data link (e.g., the preferred data link) due to a ranking score of the LTE data link being higher than the MPLS data link.

One or more embodiments of the present disclosure may facilitate the identification of a preferred data link between a local and a remote device based on the data link preference of the local device transmitting data and the remote device receiving data. For example, scores representing an order of preference for various data links of the local device may be combined with scores representing an order of preference for various data links of the remote device to determine an aggregate ranking score of the various data links so that the data link with the highest score may be used for communication.

Embodiments of the present disclosure are explained with reference to the accompanying drawings.

Figure 1:
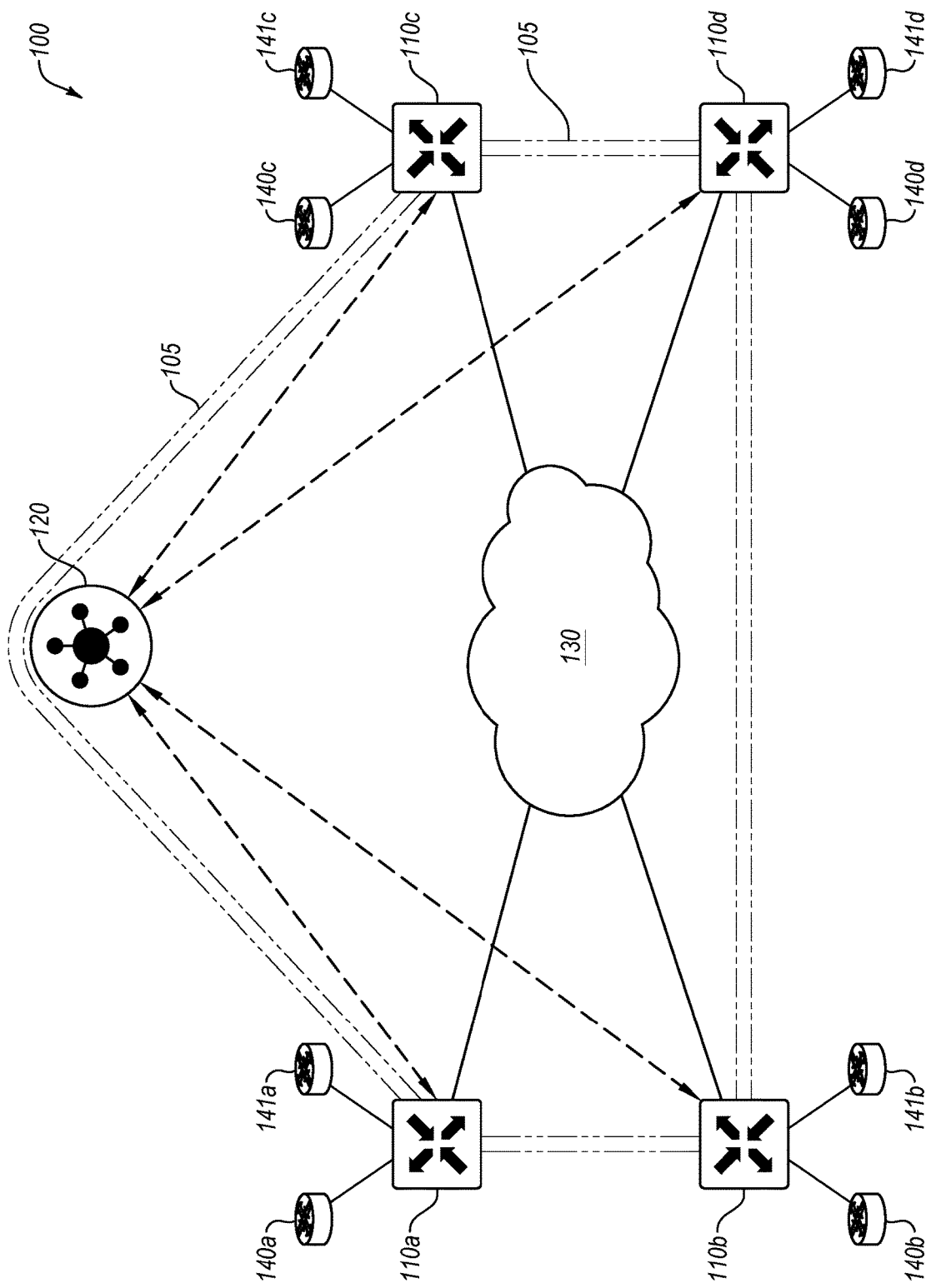
FIG. 1 illustrates an example system of network components implementing a software-defined network.

FIG. 1 illustrates an example system 100 of network components implementing a software-defined network, in accordance with one or more embodiments of the present disclosure. The system 100 may include an internal network domain 105 and one or more external network domains. The system 100 may include one or more edge network devices 110 (such as the edge network devices 110a-110d), a control device 120, and a communication network 130.

The system 100 may implement a software-defined network. A software-defined network may include a network that is managed by software rather than controlled by hardware. As such, a software-defined network may support multiple types of connections, such as the Internet, MPLS connections, and/or cellular connections (such as LTE, LTE Advanced, Worldwide Interoperability for Microwave Access (WiMAX), Evolved High Speed Packet Access (HSPA+), and/or others). Additionally, a software-defined network may support load balancing or load sharing between the various connections. Further, because of the distributed nature of a network, a software defined network may support virtual private networks (VPNs), firewalls, and other security services. In a software-defined network, for example, a control plane may be functionally separated from the physical topology. In some embodiments, a software-defined network may separate the control plane of the network (to be managed via software) from a data plane of the network (operating on the hardware of the network). As used herein, the term control plane may refer to communications and connections used in the control and administration of a network itself, rather than the transmission of data through the network, which may occur at the data plane. As used herein, the term data plane may refer to communications and connections used in the transmission and reception of data through the network. For example, the control plane may include administrative traffic directed to a network device within a network, while the data plane may include traffic that passes through network devices within the network.

In some embodiments, a software-defined network may be implemented as a software-defined wide area network (SD-WAN), local area network (LAN), metropolitan area network (MAN), among others. While one or more embodiments of the present disclosure may be described in the context of an SD-WAN, such embodiments may also be implemented in any software-defined network.

In some embodiments, the control device 120 may be configured to manage the control plane of an internal network domain 105 by directing one or more aspects of the operation of the edge network devices 110. For example, the control device 120 may generate and/or distribute data link preference configurations to one or more of the edge network devices 110. The data link preference configurations may indicate a preference order for transmitting and/or receiving data over the data plane. The internal network domain 105 may operate as a secured and controlled domain with specific functionality and/or protocols. In some embodiments, the edge network devices 110 may operate based on one or more policies created and/or propagated by the control device 120.

In some embodiments, the edge network devices 110 may not have stored the topology and/or route paths of the entire system 100. Each of the edge network devices 110 may not need to query each other individually to determine reachability. Instead, the control device 120 may provide such information to the edge network devices 110. In these and other embodiments, the control device 120 may be configured to manage the data plane of the system 100 by directing one or more aspects of the operation of the edge network devices 110. For example, the control device 120 may receive a data link preference configuration from each of the edge network device 110. The control device 120 may determine a preferred data link between each of the edge network devices 110 and may transmit a data link preference message to the edge network devices 110 indicating the preferred data links. The control device 120 determining the preferred data links between the edge network devices 110 is discussed in further detail below in conjunction with FIG. 2. In these and other embodiments, the control device 120 may route traffic through a route based on one or more other policies of the control device 120.

The edge network devices 110 may operate at a boundary of the internal network domain 105. The edge network devices 110 may include one or more physical and/or logical connections that may operate within the internal network domain 105. Such connections may be illustrated as part of the communication network 130. Additionally or alternatively, the edge network devices 110 may include one or more physical and/or logical connections operating outside of the internal network domain 105. In some embodiments, the edge network devices 110 may determine a preferred order (e.g., a data link preference configuration) for the one or more physical and/or logical connections between each of the edge network devices 110. In some embodiments, the edge network devices 110 may determine a preferred data link for transmitting data between each of the edge network devices 110 by combining the data link preference configurations associated with each of the edge network devices 110. The edge network devices 110 determining a data link preference configuration and a preferred data link is discussed in further detail below in conjunction with FIG. 2.

In some embodiments, each data link for an edge network device 110 may be independently identifiable. For example, an edge network device 110 with a port coupled to an LTE connection, a port coupled to an MPLS connection, and a port coupled to a broadband Internet connection may include three identifiers of data links, one for the LTE connection, one for the MPLS connection, and one for the Internet connection. Such an identifier of a data link may be referred to as a transport locator (TLOC). In some embodiments, the preference of data links may be organized using TLOCs as an identifier of the data link that is in the data link preference configuration. The TLOCs may be unique in the internal network domain 105.

In some embodiments, the edge network devices 110 may communicate using typical communication protocols, such as Open Shortest Path First (OSPF), Border Gateway Protocol (BGP), Virtual Router Redundancy Protocol (VRRP), and Bi-directional Forwarding Detection (BFD), among others. Additionally or alternatively, the edge network devices 110 may support other network functionalities such as Virtual Local Area Network (VLAN) tagging, Quality of Service (QoS) monitoring, Service Level Agreements (SLA), Internet Protocol (IP) forwarding, Internet Protocol Security (IPsec), among others.

For example, with VLAN tagging, the edge network devices 110 may be configured to insert a VLAN tag into a packet header. Such a VLAN tag may identify one VLAN of multiple VLANs to which a network traffic packet belongs.

Based on the VLAN tag, the edge network devices 110 may route the network traffic packet to one or more port(s) associated with the VLAN.

As another example, with QoS monitoring, the edge network devices 110 may provide for one or more QoS metrics that may be monitored, such as jitter, bandwidth, error rate, bit rate, throughput, and/or others.

As an additional example, with SLAs, the edge network devices 110 may include an agreed upon threshold level for one or more QoS metrics, such as bandwidth, availability, jitter, and/or others. In these and other embodiments, a given edge network device 110 may be configured to adjust or otherwise modify one or more properties of how the given edge network device 110 handles or routes traffic to better comply with one or more SLAs. As an additional example, with IPsec, the edge network devices 110 may utilize IPsec to authenticate and/or encrypt network traffic. For example, a given edge network device 110 may authenticate one or more computing devices to communicate with the given edge network device 110 and/or encrypt one or more packets communicated between the computing device and the given edge network device 110.

In some embodiments, by separating the routing decisions for data outside of the internal network domain 105 from those within the internal network domain 105, the system 100 may include multiple segments that may be handled based on the policies from the control device 120. In these and other embodiments, the multiple segments may correspond to multiple VPNs that may be handled separately using the same internal network domain 105. For example, an accounting department may include one VPN and the rest of an organization may be on another VPN. As another example, an original business entity may be on one VPN and a business entity newly acquired by the original business entity may be on a separate VPN. For example, the external network devices 140a-140d may be in a first VPN with a first prefix that may identify data packets associated with the first VPN, and the external network devices 141a-141d may be in a second VPN with a second prefix associated with the second VPN. In these and other embodiments, a given edge network device 110 may provide any prefixes learned by the given edge network device 110 to the control device 120. For example, the edge network device 110a may query, learn, or otherwise obtain the first prefix of the first VPN associated with the external network device 140a and the second prefix of the second VPN associated with the external network device 141a. The edge network device 110a may transmit the first and the second prefixes to the control device 120. In these and other embodiments, the control device 120 may provide received prefixes to one or more of the edge network devices 110. For example, the prefixes received from the edge network device 110a may be communicated from the control device 120 to the edge network devices 110b-110d.

In some embodiments, the routing decisions for data being routed from within to outside of the internal network domain 105 may be based on a security preference of the edge network devices 110. Routing decisions based on policies generated and/or distributed by the control device 120 or a security preference of the network devices 110 is discussed in further detail below in conjunction with FIG. 2.

In some embodiments, one or more of the edge network devices 110 and/or the control device 120 may be implemented as one or more virtual machines operating on one or more physical computing devices. Additionally or alternatively, the edge network devices 110 and/or the control device 120 may each include an individual stand-alone computing device.

Modifications, additions, or omissions may be made to FIG. 1 without departing from the scope of the present disclosure. For example, while illustrated as including four edge network devices 110 and one control device 120, the system 100 may include any number of edge network devices 110 and control devices 120, such as thousands or tens of thousands of edge network devices 110 and more than five control devices 120. As another example, as illustrated as a single communication network 130, the communication network 130 may include multiple types of communication connections.

Figure 2:
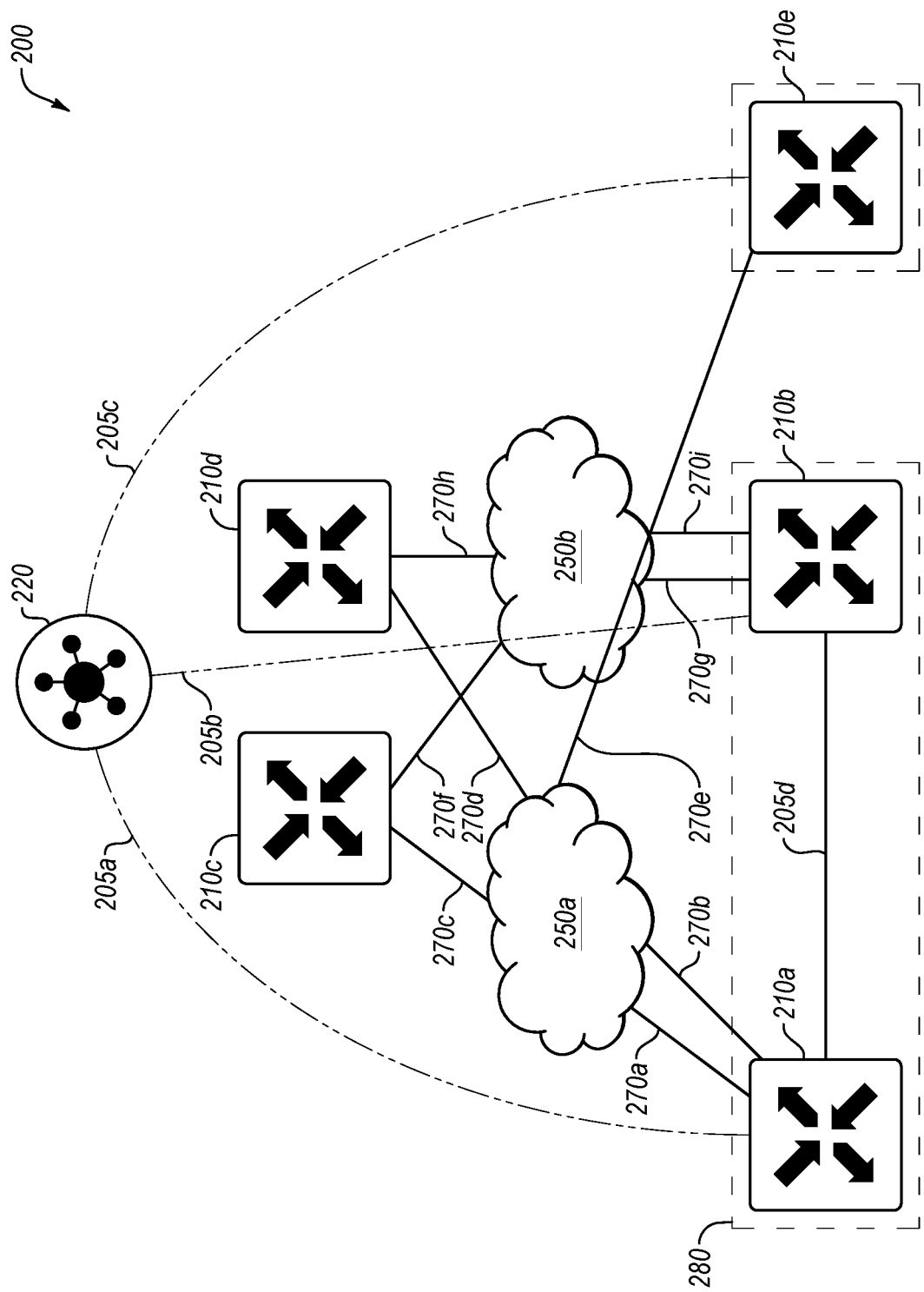
FIG. 2 illustrates another example system of network components implementing a software-defined network.

FIG. 2 illustrates another example system 200 of network components implementing a software-defined network, in accordance with one or more embodiments of the present disclosure. The example system 200 may include a control device 220. The example system 200 may include multiple edge network devices 210 (such as a first edge network device 210a, a second edge network device 210b, a third edge network device 210c, a fourth edge network device 210d, and a fifth edge network device 210e). The example system may also include multiple communication networks 250 (such as a first communication network 250a and a second communication network 250b). The system 200 may include a control plane with multiple control links 205 (such as a first control link 205a, a second control link 205b, a third control link 205c, and a fourth control link 205d).

In some embodiments, the edge network devices 210 may be configured to transmit data to other edge network devices 210 through one or more of the data links 270 over one or more of the communication networks 250. In these and other embodiments, the data links 270 may communicatively couple one or more ports of the edge network devices 210 to the communication networks 250. In some embodiments, the data links 270 may include one or more of an MPLS data link, a broadband data link, an Internet data link, an LTE data link, an LTE Advanced data link, a WiMAX data link, an HSPA+ data link, or any other suitable data link configured for transmission of data. In some embodiments, the communication networks 250 may be one or more of an MPLS communication network, broadband communication network, WiMAX communication network, an HSPA+ communication network, or any other suitable communication network configured for transmission of data.

In some embodiments, the edge network devices 210 may encapsulate the data to be transmitted. For example, the data may be encapsulated using a generic routing encapsulation (GRE) algorithm, an IPsec algorithm, or any other suitable encapsulation algorithm.

In some embodiments, a given edge network device 210 may determine a data link preference configuration for the data links 270 of the given edge network device 210. The data link preference configuration may indicate a preference order for the data links 270 through which the given edge network device 210 may transmit and/or receive data.

In some embodiments, the data link preference configurations may include a ranking score for each data link 270 (including each data port of the edge network devices 210) and a TLOC that identifies the data link 270. For example, each data link 270 may be given a ranking score between 0-100, where a ranking score of 0 may indicate a low preference for the corresponding data link 270 and a ranking score of 100 may indicate a high preference for the corresponding data link 270.

Examples of data link preference configurations may be illustrated in the following tables:

Edge Network Device 210*b*

| TLOC | Rank |
| --- | --- |
| 125378 (identifying first Internet data link) | 50 |
| 698733 (identifying second Internet data link) | 0 |

Edge Network Device 210*c*

| TLOC | Rank |
| --- | --- |
| 145928 (identifying MPLS data link) | 100 |
| 183025 (identifying LTE data link) | 100 |

Edge Network Device 210*d*

| TLOC | Rank |
| --- | --- |
| 987523 (identifying MPLS data link) | 100 |
| 234834 (identifying LTE data link) | 100 |

In some embodiments, the ranking score may be based on the type of data link, the type of encapsulation algorithm used, the type of communication network over which the corresponding data link may transmit and/or receive data, other factors, or any combination thereof. For example, the edge network devices 210 may generate a lower ranking score for an LTE data link using GRE encapsulation than an LTE data link using IPsec encapsulation. The LTE data link using IPsec encapsulation may include a higher ranking score due to IPsec encapsulation encrypting data and GRE encapsulation not encrypting data. As another example, the edge network devices 210 may generate a higher ranking score for a broadband data link over an Internet communication network using any encapsulation algorithm than an LTE data link over an Internet communication network using any encapsulation algorithm because the LTE data link over the Internet communication network may charge to transmit and/or receive data.

The ranking scores may be selected by the edge network devices 210 based on any of a variety of factors. For example, the ranking scores may be based on the viability of a data link (e.g., broken data links or data links coupled to a physically damaged network may have a low score). As another example, the ranking scores may be based on transmission rates. For example, a higher ranking score may be generated for a data link that has a higher data rate for transmitting and/or receiving data. As another example, the ranking scores may be based on costs. For example, a higher ranking score may be generated for a data link that does not incur additional costs for transmitting and/or receiving data. As another example, the ranking scores may be based on processing overhead of the data. For example, a higher ranking score may be generated for a data link that does not encrypt the data during circumstances in which there is a large amount of data to distribute or for an edge network device 210 that does not receive sensitive data, since encryption may use more time to prepare the data to be transmitted. In these and other embodiments, the ranking scores may be determined to improve efficiency of transmitting and/or receiving data within the system 200.

In some embodiments, the edge network devices 210 may determine an aggregate ranking score for each route between the edge network devices 210 by combining the ranking score of the individual data links 270 of the edge network devices 210 in the different routes. For example, to determine an aggregate ranking score for a route between the second edge network device 210*b* and the third edge network device 210*c*, the second edge network device 210*b* may determine an aggregate ranking score for the route that includes the seventh data link 270*g* and the sixth data link 270*f* over the second communication network 250*b*. Likewise, the second edge network device 210*b* may determine an aggregate ranking score for the route that includes the ninth data link 270*i* and the sixth data link 270*f* over the second communication network 250*b*. While described below as simple addition, it will be appreciated that any mathematical or other combination may be used to combine the two scores, for example, by weighting one score more than another, etc.

Following the examples above, the sixth data link 270*f* may have a ranking score of 100, the seventh data link 270*g* may have a ranking score of 50, and the ninth data link 270*i* may have a ranking score of 0. The aggregate ranking score for the route that includes the seventh data link 270*g* and the sixth data link 270*f* over the second communication network 250*b* may be one hundred fifty (e.g., 50+100=150). The aggregate ranking score for the route that includes the ninth data link 270*i* and the sixth data link 270*f* over the second communication network 250*b* may be one hundred (e.g., 100+0=100).

In some embodiments, each of the edge network devices 210 may determine the preferred data link (e.g., a preferred route) for transmitting data to the other edge network devices 210 by determining which routes include the highest aggregate ranking score. As discussed above, the aggregate ranking score for transmitting data between the second edge network device 210*b* and the third edge network device 210*c* through the seventh data link 270*g* and the sixth data link 270*f* over the second communication network 250*b* may be one hundred and fifty. Likewise, the aggregate ranking score for transmitting data between the second edge network device 210*b* and the third edge network device 210*c* through the ninth data link 270*i* and the sixth data link 270*f* over the second communication network 250*b* may be one hundred. The preferred data link for transmitting data from the second edge network device 210*b* to the third edge network device 210*c* may be through the seventh data link 270*g* and the sixth data link 270*f* over the second communication network 250*b* since the aggregate ranking score of one hundred and fifty is greater than the aggregate ranking score of one hundred. Likewise, the third edge network device 210*c* may determine that the preferred data link for transmitting data from the third edge network device 210*c* to the second edge network device 210*b* may be through the sixth data link 270*f* and the seventh data link 270*g* over the second communication network 250*b* since the aggregate ranking score of one hundred fifty is greater than the aggregate ranking score of one hundred. In some embodiments, when the edge network devices 210 include data to be transmitted, the edge network devices 210 may transmit the data to the other edge network devices 210 over preferred data links.

In some embodiments, two or more routes between the edge network devices 210 may include equal or similar aggregate ranking scores. In these and other embodiments, the edge network devices 210 may determine that the two or more routes with equal or similar aggregate ranking scores are all preferred data links and may transmit data to the other edge network devices 210 over the two or more preferred data links instead of over a single preferred data link. For example, the first data link 270a and the second data link 270b may both include a ranking score of fifty and the third data link 270c may include a ranking score of one hundred. Thus, the aggregate ranking score for the different routes between the first edge network device 210a and the third edge network device 210c may be the same (e.g. 50+100=150). In these and other embodiments, the second edge network device 210b may transmit data through the first data link 270a and the third data link 270c over the first communication network 250a and also through the second data link 270b and the third data link 270c over the first communication network 250a.

In some embodiments, the edge network devices 210 may transmit the corresponding data link preference configurations to the control device 220 over the control links 205. In these and other embodiments, the edge network devices 210 may receive the data link preference configurations from the control device 220 over the control links 205. Additionally or alternatively, the edge network devices 210 may transmit the data link preference configurations to the other edge network devices 210. For example, the first edge network device 210a may transmit the first data link preference configuration to the second edge network device 210b, the third edge network device 210c, the fourth edge network device 210d, and the fifth edge network device 210e. In these and other embodiments, the edge network devices 210 may be configured to receive the data link preference configurations from one or more of the other edge network devices 210.

In some embodiments, the data link preference configurations may identify the corresponding edge network device 210 that generated the particular data link preference configuration. For example, a first data link preference configuration may be associated with the first edge network device 210a and may identify the first edge network device 210a and that the first edge network device 210a may transmit and/or receive data through the first data link 270a and/or the second data link 270b. Additionally or alternatively, the data link preference configurations may identify the corresponding edge network device 210 and a portion of the data links 270 that the corresponding edge network device 210 may transmit and/or receive data through. For example, the first data link preference configuration may identify the first edge network device 210a and that the first edge network device 210a may transmit and/or receive data through the first data link 270a and a second data link preference configuration may identify the first edge network device 210a and that the first edge network device 210a may transmit and/or receive data through the second data link 270b.

In some embodiments, each of the edge network devices 210 may determine a security data link preference configuration for transmitting and/or receiving data through the data links 270. In these and other embodiments, the security data link preference configurations may be based on a preferred encryption level of the data, the type of data being transmitted, the type of edge network device 210 that is transmitting and/or receiving the data, and/or any combination thereof. In some embodiments, the security data link preference configurations may be based on one or more policies from the control device 220.

In some embodiments, the edge network devices 210 may transmit and/or receive the security data link preference configurations in a similar manner to the data link preference configurations.

In some embodiments, the edge network devices 210 may determine whether the data to be transmitted is secure data. For example, the data to be transmitted may include personal information such as a person's social security number or credit card information, the edge network devices 210 may determine that this data is secure data and may encrypt this data to prevent the data from being compromised. As another example, one or more of the edge network devices 210 may be a secure edge network device and for data to be transmitted and/or received by the secure edge network device the data may have to be encrypted. As another example, the edge network devices 210 may determine whether the data is coming from a secure application, a secure department (e.g., accounting), or is being routed to a secure application or department (e.g., accounting). In these and other embodiments, if the data to be transmitted is secure data, the edge network devices 210 may override transmitting the data over the preferred data link according to the highest aggregate ranking score and may transmit the secure data over a secure preferred data link according to the data link security preference configurations. In these and other embodiments, if the data to be transmitted is not secure data, the edge network devices 210 may transmit the data over the preferred data link according to the highest aggregate ranking score.

In some embodiments, the edge network devices 210 may determine whether a data link failure has occurred on any of the multiple data links 270. For example, the edge network devices 210 may monitor one or more QoS metrics on the data links 270. If one or more of the edge network devices 210 determines a data link failure has occurred (e.g., one or more of the QoS metrics is outside a threshold range), the edge network devices 210 may determine if the failure occurred on a data link 270 included in a preferred data link and/or a secure preferred data link.

In some embodiments, if the failure occurred on a data link 270 that is part of a preferred data link and/or a secure preferred data link, the corresponding edge network devices 210 may determine a secondary preferred data link based on the aggregate ranking scores and/or a secondary secure preferred data link based on the security data link preference configurations. For example, if the preferred data link for transmitting data between the second edge network device 210b and the third edge network device 210c includes the seventh data link 270g and the sixth data link 270f over the second communication network 250b and a data link failure occurs on the seventh data link 270g, the second edge network device 210b may determine the secondary preferred data link for transmitting data from the second edge network device 210b to the third edge network device 210c may be through the ninth data link 270i and the sixth data link 270f over the second communication network 250b. Similarly, the third edge network device 210c may determine the secondary preferred data link for transmitting data from the third edge network device 210c to the second edge network device 210b may be through the sixth data link 270f and the ninth data link 270i over the second communication network 250b.

In some embodiments, if the data link failure on the preferred data link and/or the secure preferred data link is resolved and the preferred data link and/or the secure preferred data link resumes functionality, the edge network devices 210 may cease transmitting data over the secondary preferred data link and/or the secondary secure preferred data link and may resume transmitting data over the preferred data link and/or the secure preferred data link.

In some embodiments, the control device 220 may perform one or more of the functions of the edge network devices 210 discussed above. In these and other embodiments, the control device 220 may determine the preferred data link for transmitting data between the edge network devices 210 by determining the aggregate ranking score for each route between the edge network devices 210 as discussed above. As another example, the control device 220 may forward the data link preference configurations to the edge network devices 210. In some embodiments, the control device 220 may generate a preferred data link message indicating which route is the preferred data link for transmitting data between each of the edge network devices 210 based on the data link preference configurations and/or the security data link preference configurations. In these and other embodiments, the control device 220 may transmit the preferred data link message to each of the edge network devices 210.

In some embodiments, the edge network devices 210 may be located at multiple physical locations and may implement a WAN. For example, as shown in the illustrated example, the first edge network device 210a and the second edge network device 210b may be located at a first location 280, the third edge network device 210c and the fourth edge network device 210d may be remotely located from the other edge network devices 210, and the fifth edge network device 210e may be located at a second location 290. Additionally or alternatively, one or more of the edge network devices 210 may be configured as data center network devices.

In some embodiments, the edge network devices 210 may be located at a single physical location and may implement a LAN. For example, the edge network devices 210 may be located at a bank, retail store, school, etc., and may be configured to transfer and receive data within the LAN.

Modifications, additions, or omissions may be made to FIG. 2 without departing from the scope of the present disclosure. For example, while illustrated as including a certain number of edge network devices 210, the system 200 may include any number of edge network devices 210. As another example, while illustrated as including two communication networks 250 any number of communication networks may be utilized. Likewise, while illustrated as including nine data links 270 any number of data links may be utilized. Additionally, while described in the context of network devices, the same principles may be applied to any electronic devices with multiple modalities of communication, such as mobile telephones, personal computers, and/or others.

Figure 3:
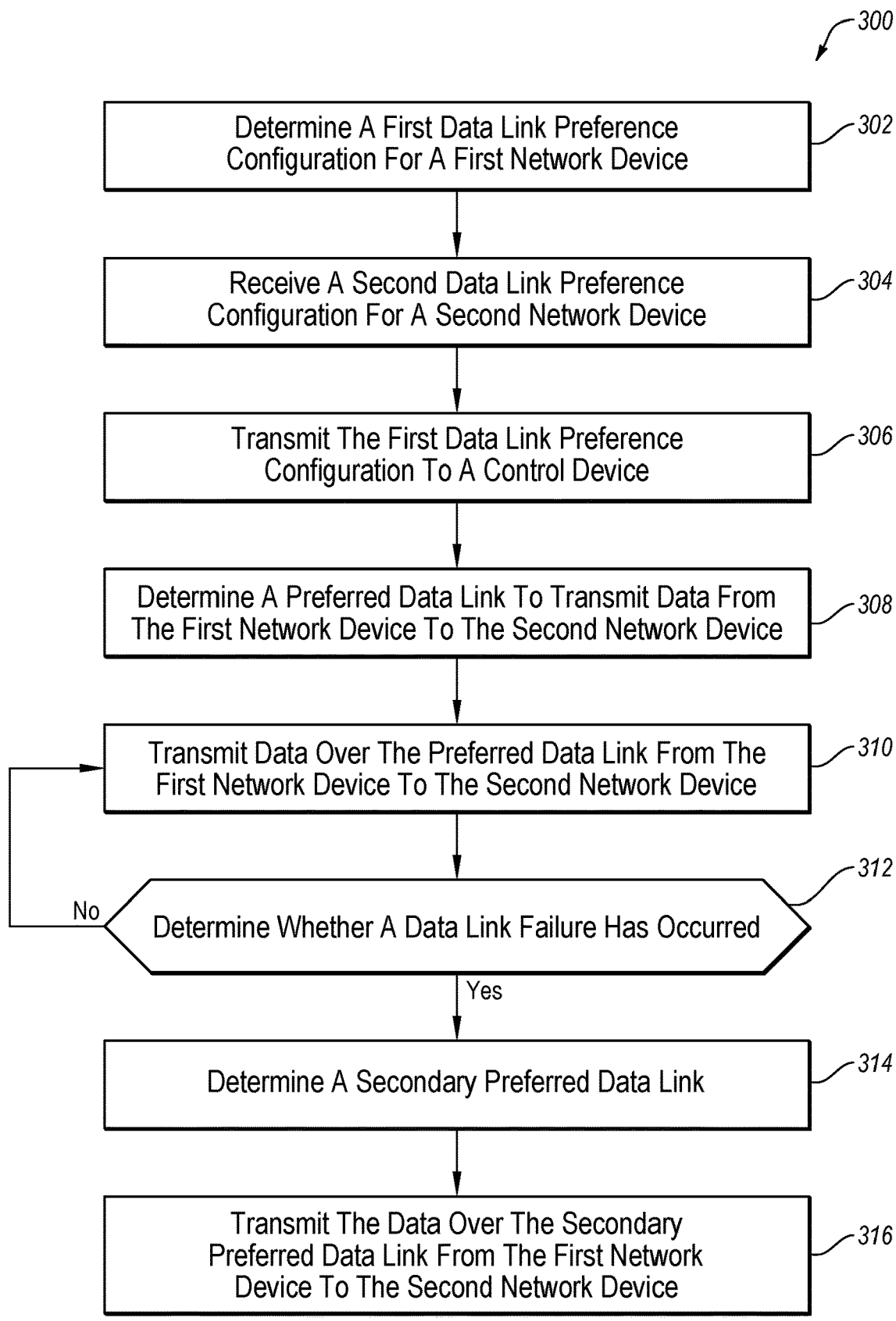
FIG. 3 illustrates a flowchart of an example method of routing data based on network load balancing.

FIG. 3 illustrates a flowchart of an example method 300 of routing data based on network load balancing within a software-defined network, in accordance with one or more embodiments of the present disclosure. Although illustrated as discrete blocks, various blocks may be divided into additional blocks, combined into fewer blocks, or eliminated, depending on the particular implementation.

At block 302, a first data link preference configuration for a first network device may be determined. For example, the first network device (such as the edge network devices 110 and 210 of FIGS. 1 and 2) may determine a data link preference configuration for each data link over which the first network device communicates. For example, the first network device may obtain or observe its own data link preference configuration. For example, with reference to the second edge network device 210b, the second edge network device 210b may obtain its own data link preference configuration indicating that the seventh data link 270g may have a ranking score of fifty and the ninth data link 270i may have a ranking score of zero.

At block 304, a second data link preference configuration for a second network device may be received. For example, the first network device may receive a data link preference configuration for each data link over which the second network device communicates. For example, the first network device may receive the second data link preference configuration from a control device (such as the control devices 120 and 220 of FIGS. 1 and 2). For example, with reference to FIG. 2, the second edge network device 210b may receive the second data link preference configuration from the control device 220. Additionally or alternatively, the first network device may receive the second data link preference configuration from the second network device. For example, with reference to FIG. 2, the second edge network device 210b may receive the second data link preference configuration from the third edge network device 210c.

At block 306, the first data link preference configuration may be transmitted to a control device. For example, the first network device may transmit the data link preference configuration for each of the data links over which it communicates to a control device. For example, with reference to FIG. 2, the second edge network device 210b may transmit its data link preference configuration to the control device 220 over the control link 205.

At block 308, a preferred data link to transmit data from the first network device to the second network device may be determined. For example, the first network device may determine an aggregate ranking score for each route between the first network device and the second network device by combining the first data link preference configuration and the second data link preference configuration. For example, the second edge network device 210b may combine the ranking score of the sixth data link 270f and the ninth data link 270i over the second communication network 250b and may also combine the sixth data link 270f and the ninth data link 270i over the second communication network 250b as discussed above in conjunction with FIG. 2. Additionally or alternatively, the control device may determine an aggregate ranking score for each route between the first network device and the second network device by combining the first data link preference configuration and the second data link preference configuration and transmitting a data link preference configuration message to the first network device as discussed above in conjunction with FIG. 2.

In some embodiments, the preferred data link may be the route with the highest aggregate ranking score. For example, the preferred data link between the second edge network device 210b and the third edge network device 210c may be through the sixth data link 270f and the seventh data link 270g over the second communication network 250b as discussed above in conjunction with FIG. 2.

At block 310, data may be transmitted over the preferred data link from the first network device to the second network device. For example, with reference to FIG. 2, the second edge network device 210b may transmit data to the third edge network device 210c through the through the sixth data link 270f and the seventh data link 270g over the second communication network 250b (e.g., the preferred data link between the second edge network device 210b and the third edge network device 210c)

At block 312, a determination may be made as to whether a data link failure on the preferred data link has occurred. For example, the first network device may monitor one or more QoS metrics of the data links and may determine whether one or more of the QoS metrics of one or more of the data links are outside a threshold range. For example, the second edge network device 210b may monitor one or more QoS metric of the sixth data link 270f and the ninth data link 270*i* and may determine whether a data link failure has occurred and whether the data link failure has occurred on the seventh data link 270*g*. If no data link failure on the preferred data link has occurred, the method 300 may return to block 310 and transmit the data over the preferred data link. If a data link failure has occurred, the method 300 may proceed to block 314.

At block 314, a secondary preferred data link may be determined. In some embodiments, the secondary preferred data link may be the route with the second highest aggregate ranking score. For example, the secondary preferred data link between the second edge network device 210*b* and the third edge network device 210*c* may be through the ninth data link 270*i* and the sixth data link 270*f* over the second communication network 250*b* since it has the second highest aggregate ranking score. At block 316, the data may be transmitted over the secondary preferred data link from the first network device to the second network device.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 4:
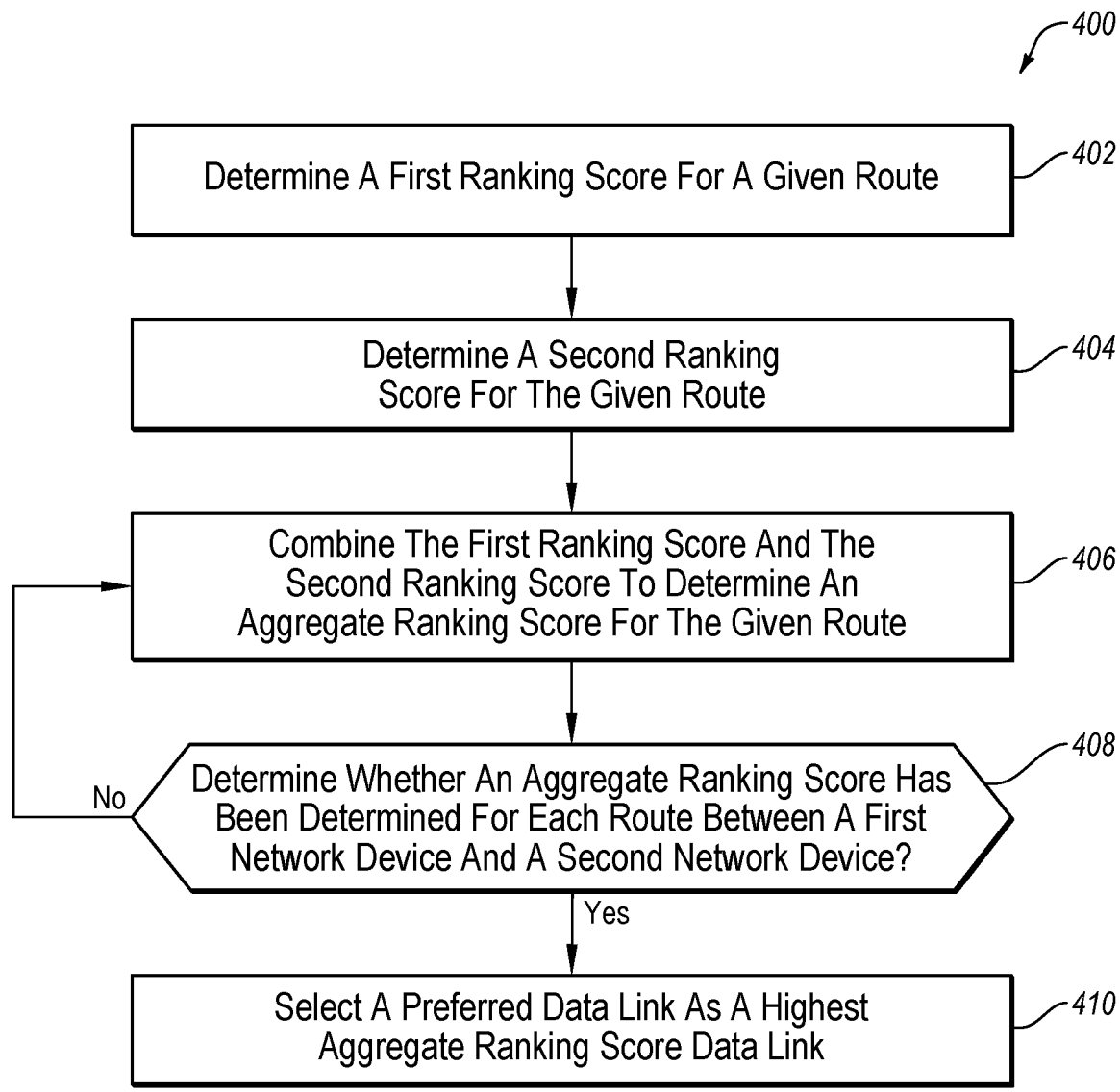
FIG. 4 illustrates a flowchart of an example method of determining a preferred data link.

FIG. 4 illustrates a flowchart of an example method 400 of determining a preferred data link, in accordance with one or more embodiments of the present disclosure. Although illustrated as discrete blocks, various blocks may be divided into additional blocks, combined into fewer blocks, or eliminated, depending on the particular implementation.

At block 402, a first ranking score for a given route may be determined. For example, the first ranking score may be determined by a first network device (such as the edge network devices 110 and 210 of FIGS. 1 and 2). For example, with reference to the second edge network device 210*b*, the second edge network device 210*b* may determine its own data link preference configuration that may include the ranking score for a particular data link that is part of the given route.

At block 404, a second ranking score for the given route may be determined. For example, the second ranking score may be determined by the first network device based on a second data link preference configuration associated with the second network device that includes another data link in the route. For example, with reference to the second edge network device 210*b*, the second edge network device 210*b* may determine the ranking score of the given route based on a data link preference configuration associated with the third edge network device 210*c*.

At block 406, the first ranking score and the second ranking score may be combined to determine an aggregate ranking score for the given route. In some embodiments, the first network device may determine the aggregate ranking score for the given route by combining the ranking scores as discussed above in conjunction with FIG. 2. For example, the second edge network device 210*b* may combine the ranking score associated with the sixth data link 270*f* and the seventh data link 270*g* to determine an aggregate ranking score for transmitting data through the sixth data link 270*f* and the seventh data link 270*g* over the second communication network 250*b*.

At block 408, a determination may be made as to whether an aggregate ranking score has been determined for each route between the first network device and the second network device. For example, with reference to the second edge network device 210*b*, the second edge network device 210*b* may determine whether an aggregate ranking score has been determined for transmitting data through the sixth data link 270*f* and the seventh data link 270*g* over the second communication network 250*b* and through the ninth data link 270*i* and the seventh data link 270*g* over the second communication network 250*b*. If an aggregate ranking score has not been determined for each route between the first network device and the second network device, the method 400 may return to block 406 and determine an aggregate ranking score for any remaining routes. If an aggregate ranking score has been determined for each route between the first network device and the second network device, the method 400 may proceed to block 410.

At block 410, a preferred data link may be selected as a highest aggregate ranking score data link. For example, with reference to the second edge network device 210*b*, the second edge network device 210*b* may select the sixth data link 270*f* and the seventh data link 270*g* over the second communication network 250*b* as the preferred data link (e.g., a preferred route) since the aggregate score of one hundred fifty is greater than one hundred as discussed above in conjunction with FIG. 2.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 5:
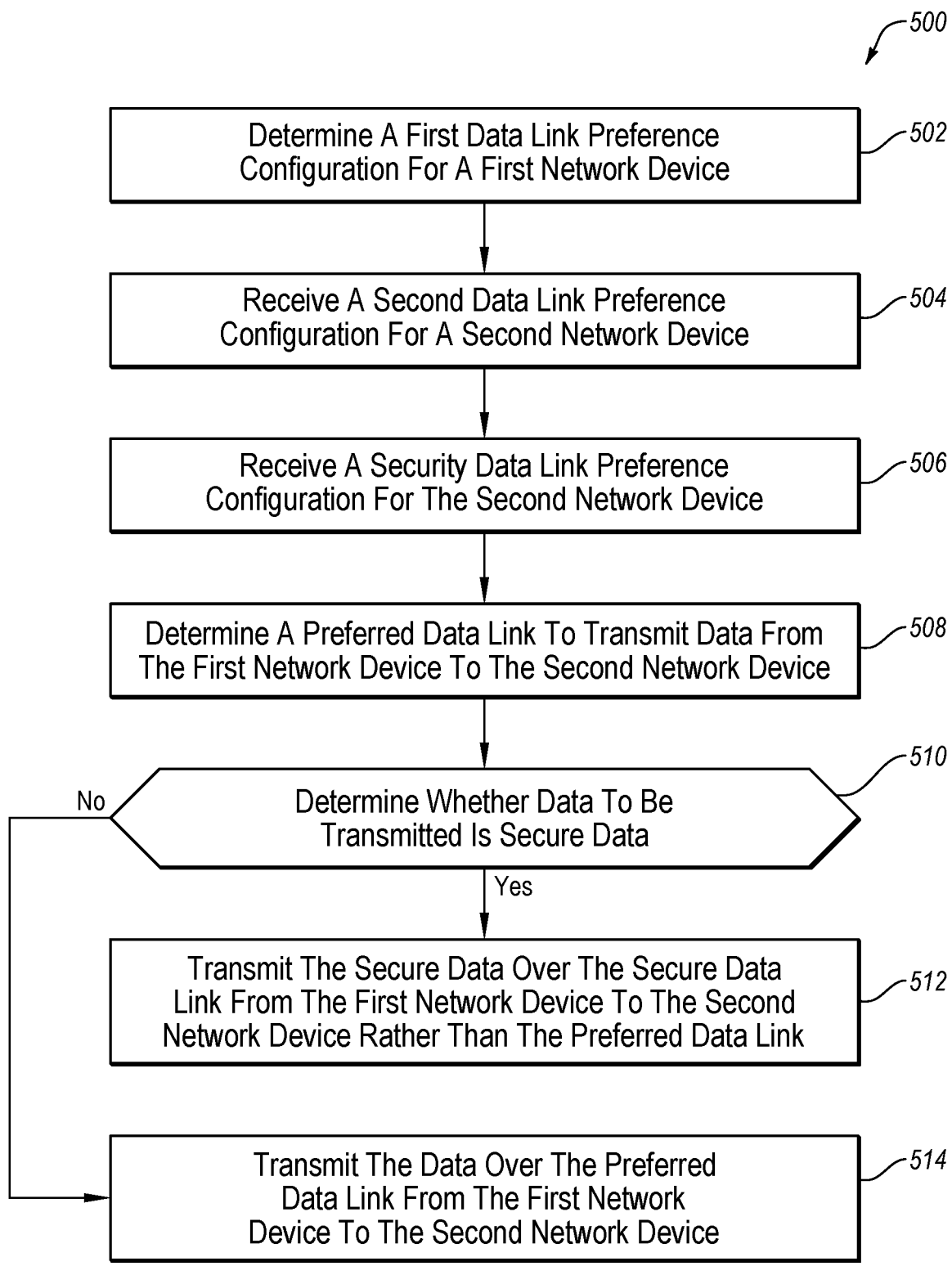
FIG. 5 illustrates a flowchart of an example method of routing data based on network load balancing and a security preference.

FIG. 5 illustrates a flowchart of an example method 500 of routing data based on network load balancing and a security preference, in accordance with one or more embodiments of the present disclosure. Although illustrated as discrete blocks, various blocks may be divided into additional blocks, combined into fewer blocks, or eliminated, depending on the particular implementation.

At block 502, a first data link preference configuration for a first network device may be determined. For example, the first network device (such as the edge network devices 110 and 210 of FIGS. 1 and 2) may determine a data link preference configuration for each data link over which the first network device communicates. For example, the first network device may obtain or observe its own data link preference configuration. For example, with reference to the second edge network device 210*b*, the second edge network device 210*b* device may obtain its own data link preference configuration indicating that the seventh data link 270*g* may have a ranking score of fifty and the ninth data link 270*i* may have a ranking score of zero.

At block 504, a second data link preference configuration for a second network device may be received. For example, the first network device may receive a data link preference configuration for each data link over which the second network device communicates. For example, the first network device may receive the second data link preference configuration from a control device (such as the control devices 120 and 220 of FIGS. 1 and 2). Additionally or alternatively, the first network device may receive the second data link preference configuration from the second network device. For example, with reference to the second edge network device 210*b*, the second edge network device 210*b* may receive the second data link preference configuration from the control device 220. Additionally or alternatively, the second edge network device 210b may receive the second data link preference configuration from the third edge network device 210c.

At block 506, a security data link preference configuration may be received for the second network device. For example, the first network device may receive the security data link preference configuration from the control device and/or the second network device. For example, the first network device may receive the security data link preference configuration for the second network device receiving secure data, which may be based on a preferred encryption level of the data, the type of data being transmitted, the type of edge network device receiving the data, or any combination thereof. For example, with reference to the second edge network device 210b, the second edge network device 210b may receive a security data link preference configuration associated with the third edge network device 210c from the control device 220 and/or the third edge network device 210c.

At block 508, a preferred data link to transmit data from the first network device to the second network device may be determined. For example, the first network device may determine an aggregate ranking score for each route between the first network device and the second network device by combining the first data link preference configuration and the second data link preference configuration. For example, the second edge network device 210b may combine the ranking scores of the sixth data link 270f and the ninth data link 270i over the second communication network 250b and may also combine the ranking scores of the sixth data link 270f and the ninth data link 270i over the second communication network 250b as discussed above in conjunction with FIG. 2. Additionally or alternatively, the control device may determine an aggregate ranking score for each route between the first network device and the second network device by combining the first data link preference configuration and the second data link preference configuration and transmitting a data link preference configuration message to the first network device as discussed above.

At block 510, a determination may be made as to whether data to be transmitted is secure data. The first network device may determine whether the data to be transmitted is secure data based on the type of data to be transmitted and/or what type of network device the second network device is. For example, the second edge network device 210b may determine whether the data to be transmitted to the third edge network device 210c is secure data based on a security data link preference configuration associated with the third edge network device 210c. If the data to be transmitted is not secure data, the method 500 may proceed to block 514 and may transmit the data over the preferred data link based on the aggregate ranking score for the routes between the first network device and the second network device. If the data to be transmitted is secure data, the method 500 may proceed to block 512 and may transmit the secure data over the secure data link from the first network device to the second network device rather than the preferred data link.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 6:
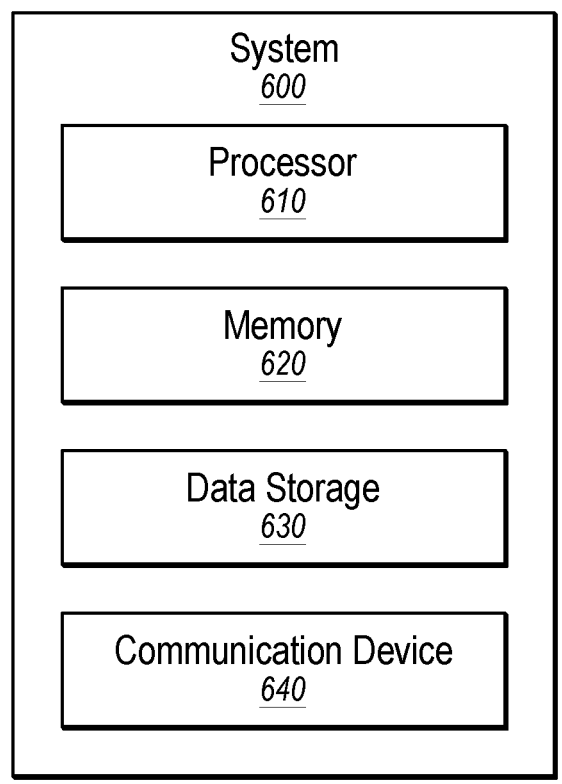
FIG. 6 illustrates an example computing system.

FIG. 6 illustrates an example computing system 600, according to at least one embodiment described in the present disclosure. The computing system 600 may include any suitable system, apparatus, or device configured to test software. The computing system 600 may include a processor 610, a memory 620, a data storage 630, and a communication unit 640, which all may be communicatively coupled. In some embodiments, any of the network devices (e.g., the edge network devices 110 or 210 of FIGS. 1 and 2), control devices (e.g., the control devices 120 or 220 of FIGS. 1 and 2), or other computing devices of the present disclosure may be implemented as the computing system 600. Additionally or alternatively, one or more of the network devices, control devices, local computing devices or other computing devices may be implemented as virtualized machines operating on a physical computing system such as the computing system 600.

Generally, the processor 610 may include any suitable special-purpose or general-purpose computer, computing entity, or processing device including various computer hardware or software modules and may be configured to execute instructions stored on any applicable computer-readable storage media. For example, the processor 610 may include a microcontroller, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that the processor 610 may include any number of processors distributed across any number of network or physical locations that are configured to perform individually or collectively any number of operations described in the present disclosure. In some embodiments, the processor 610 may interpret and/or execute program instructions and/or process data stored in the memory 620, the data storage 630, or the memory 620 and the data storage 630. In some embodiments, the processor 610 may fetch program instructions from the data storage 630 and load the program instructions into the memory 620.

After the program instructions are loaded into the memory 620, the processor 610 may execute the program instructions, such as instructions to perform the methods 300, 400, and/or 500 of FIGS. 3-5, respectively. For example, the processor 610 may determine a first data link preference configuration for the network device. As another example, the processor may determine a preferred data link to transmit data from the network device to another network device by combining the first data link preference configuration and a second data link preference configuration.

The memory 620 and the data storage 630 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 610. In some embodiments, the computing system 600 may or may not include either of the memory 620 and the data storage 630.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 610 to perform a certain operation or group of operations.

The communication unit 640 may include any component, device, system, or combination thereof that is configured to transmit or receive information over a network, such as an MPLS connection, the Internet, a cellular network (e.g., an LTE network), etc. In some embodiments, the communication unit 640 may communicate with other devices at other locations, the same location, or even other components within the same system. For example, the communication unit 640 may include a modem, a network card (wireless or wired), an optical communication device, an infrared communication device, a wireless communication device (such as an antenna), a chipset (such as a Bluetooth device, an 802.6 device (e.g., Metropolitan Area Network (MAN)), a WiFi device, a WiMax device, cellular communication facilities, or others), and/or the like, or any combinations thereof. The communication unit 640 may permit data to be exchanged with a network and/or any other devices or systems described in the present disclosure. For example, the communication unit 640 may allow the computing system 600 to communicate with other systems, such as network devices, control devices, and/or other networks.

Modifications, additions, or omissions may be made to the computing system 600 without departing from the scope of the present disclosure. For example, the data storage 630 may be multiple different storage mediums located in multiple locations and accessed by the processor 610 through a network.

As indicated above, the embodiments described in the present disclosure may include the use of a special purpose or general purpose computer (e.g., the processor 610 of FIG. 6) including various computer hardware or software modules, as discussed in greater detail below. Further, as indicated above, embodiments described in the present disclosure may be implemented using computer-readable media (e.g., the memory 620 or data storage 630 of FIG. 6) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
    determining a first data link preference configuration indicating a first preference order for a first plurality of data links over which a first network device communicates, the first data link preference configuration based on at least one of a preferred encryption level of data, a type of data being transmitted, or a type of edge network device;
    receiving a second data link preference configuration indicating a second preference order for a second plurality of data links over which a second network device communicates;
    determining a preferred data link to transmit data from the first network device to the second network device based on a combination of the first data link preference configuration and the second data link preference configuration; and
    transmitting data over the preferred data link from the first network device to the second network device.

2. The method of claim 1, wherein the determining of the preferred data link includes, for each data link between the first network device and the second network device:
    determining a first ranking score for a given data link from the first data link preference configuration, the first ranking score based on at least one of a type of data link, a type of encapsulation algorithm, or a type of communication network;
    determining a second ranking score for the given data link from the second data link preference configuration;
    combining the first ranking score and the second ranking score to determine an aggregate ranking score; and
    selecting the preferred data link as a highest aggregate ranking score data link.

3. The method of claim 2, wherein the transmitting of the data over the preferred data link from the first network device to the second network device includes transmitting the data over the preferred data link and an additional data link from the first network device to the second network device based on the additional data link and the preferred data link having a matching aggregate ranking score.

4. The method of claim 1, further comprising:
    receiving a security data link preference configuration indicating secure data is to be sent over a secure data link from the first network device to the second network device.

5. The method of claim 4, further comprising:
    in response to determining the data to be transmitted is the secure data, transmitting the secure data over the secure data link rather than the preferred data link.

6. The method of claim 1, wherein the first plurality of data links include two or more of a Multi-Protocol Label Switching (MPLS) link, a broadband link, an Internet link, a Long Term Evolution (LTE) link, an LTE Advanced link, a Worldwide Interoperability for Microwave Access (WiMAX) link, an Evolved High Speed Packet Access (HSPA+) link, or any combination thereof.

7. The method of claim 1, further comprising:
    receiving the second data link preference configuration from a control device; and
    transmitting the first data link preference configuration to the control device.

8. The method of claim 1, further comprising:
    determining whether a data link failure has occurred on the preferred data link; and
    in response to determining the data link failure has occurred on the preferred data link, determining a secondary preferred data link and transmitting data from the first network device to the second network device over the secondary preferred data link.

9. A non-transitory computer-readable medium that includes computer-readable instructions stored thereon that are executable by a processor to perform or control performance of operations comprising:
    determining a first data link preference configuration indicating a first preference order for a first plurality of data links over which a first network device communicates, the first data link preference configuration based on at least one of a preferred encryption level of data, a type of data being transmitted, or a type of edge network device;
    receiving a second data link preference configuration indicating a second preference order for a second plurality of data links over which a second network device communicates;
    determining a preferred data link to transmit data from the first network device to the second network device based on a combination of the first data link preference configuration and the second data link preference configuration; and
    transmitting data over the preferred data link from the first network device to the second network device.

10. The non-transitory computer-readable medium of claim 9, wherein the determining of the preferred data link includes, for each data link between the first network device and the second network device:
    determining a first ranking score for a given data link from the first data link preference configuration, the first ranking score based on at least one of a type of data link, a type of encapsulation algorithm, or a type of communication network;
    determining a second ranking score for the given data link from the second data link preference configuration;
    combining the first ranking score and the second ranking score to determine an aggregate ranking score; and
    selecting the preferred data link as a highest aggregate ranking score data link.

11. The non-transitory computer-readable medium of claim 10, wherein the transmitting of the data over the preferred data link from the first network device to the second network device includes transmitting the data over the preferred data link and an additional data link from the first network device to the second network device based on the additional data link and the preferred data link having a matching aggregate ranking score.

12. The non-transitory computer-readable medium of claim 9, wherein the operations include receiving a security data link preference configuration indicating secure data is to be sent over a secure data link from the first network device to the second network device.

13. The non-transitory computer-readable medium of claim 12, wherein the operations include, in response to determining the data to be transmitted is the secure data, transmitting the secure data over the secure data link rather than the preferred data link.

14. The non-transitory computer-readable medium of claim 9, wherein the operations include:
   determining whether a data link failure has occurred on the preferred data link; and
   in response to determining the data link failure has occurred on the preferred data link, determining a secondary preferred data link and transmit data from the first network device to the second network device over the secondary preferred data link.

15. A system comprising:
   a second network device configured to communicate over a second plurality of data links; and
   a first network device configured to communicate over a first plurality of data links, the first network device comprising:
      one or more processors; and
      one or more non-transitory computer-readable media that include computer-readable instructions stored thereon that are executable by the one or more processors to perform or control performance of operations, the operations comprising:
         determining a first data link preference configuration indicating a first preference order for the first plurality of data links over which the first network device communicates, the first data link preference configuration based on at least one of a preferred encryption level of data, a type of data being transmitted, or a type of edge network device;
         receiving a second data link preference configuration indicating a second preference order for the second plurality of data links for the second network device over which the second network device communicates;
         determining a preferred data link to transmit data from the first network device to the second network device based on a combination of the first data link preference configuration and the second data link preference configuration; and
         transmitting data over the preferred data link from the first network device to the second network device.

16. The system of claim 15, wherein the determining of the preferred data link includes, for each data link between the first network device and the second network device:
   determining a first ranking score for a given data link from the first data link preference configuration, the first ranking score based on at least one of a type of data link, a type of encapsulation algorithm, or a type of communication network;
   determining a second ranking score for the given data link from the second data link preference configuration;
   combining the first ranking score and the second ranking score to determine an aggregate ranking score; and
   selecting the preferred data link as a highest aggregate ranking score data link.

17. The system of claim 16, wherein the transmitting of the data over the preferred data link from the first network device to the second network device includes transmitting the data over the preferred data link and an additional data link from the first network device to the second network device based on the additional data link and the preferred data link having a matching aggregate ranking score.

18. The system of claim 15, the operations include receiving a security data link preference configuration indicating secure data is to be sent over a secure data link from the first network device to the second network device.

19. The system of claim 18, the operations include, in response to determining the data to be transmitted is the secure data, transmitting the secure data over the secure data link rather than the preferred data link.

20. The system of claim 15, the operations include:
   determining whether a data link failure has occurred on the preferred data link; and
   in response to the determining the data link failure has occurred on the preferred data link, determining a secondary preferred data link and transmit data from the first network device to the second network device over the secondary preferred data link.

* * * * *